US008116268B2

(12) United States Patent
Sun et al.

(10) Patent No.: US 8,116,268 B2
(45) Date of Patent: Feb. 14, 2012

(54) METHOD FOR CONTROLLING DATA TRANSMISSION

(75) Inventors: Chunying Sun, Beijing (CN); Gert-Jan Van Lieshout, Apeldoorn (NL); No-Jun Kwak, Seoul (KR); Xiaoqiang Li, Beijing (CN)

(73) Assignees: Samsung Electronics Co., LTD (KR); Beijing Samsung Telecom R&D Center, Beijing (CN)

( * ) Notice: Subject to any disclaimer, the term of this patent is extended or adjusted under 35 U.S.C. 154(b) by 758 days.

(21) Appl. No.: 11/658,948

(22) PCT Filed: Jul. 29, 2005

(86) PCT No.: PCT/KR2005/002481
§ 371 (c)(1),
(2), (4) Date: Nov. 17, 2008

(87) PCT Pub. No.: WO2006/011777
PCT Pub. Date: Feb. 2, 2006

(65) Prior Publication Data
US 2009/0168729 A1 Jul. 2, 2009

(30) Foreign Application Priority Data

Jul. 29, 2004 (CN) .......................... 2004 1 0071137
Aug. 17, 2004 (CN) .......................... 2004 1 0058162

(51) Int. Cl.
*H04W 4/00* (2009.01)
(52) U.S. Cl. ..................................... 370/329; 455/422.1

(58) Field of Classification Search ........................ None
See application file for complete search history.

(56) References Cited

U.S. PATENT DOCUMENTS

| 6,909,887 | B2 * | 6/2005 | Fauconnier et al. | 455/403 |
| 7,035,669 | B2 * | 4/2006 | Hashimoto | 455/560 |
| RE41,000 | E * | 11/2009 | Willars et al. | 370/507 |
| 2002/0009129 | A1 | 1/2002 | Choi et al. | |
| 2003/0039273 | A1 | 2/2003 | Jang | |
| 2003/0117975 | A1 * | 6/2003 | Yanai | 370/331 |
| 2003/0117997 | A1 * | 6/2003 | Kim | 370/350 |
| 2004/0008646 | A1 * | 1/2004 | Park et al. | 370/331 |
| 2004/0024791 | A1 * | 2/2004 | Martin et al. | 707/200 |

FOREIGN PATENT DOCUMENTS

JP 2000-286784 10/2000

* cited by examiner

*Primary Examiner* — Kevin C Harper
*Assistant Examiner* — Rhonda Murphy
(74) *Attorney, Agent, or Firm* — The Farrell Law Firm, P.C.

(57) ABSTRACT

A method for controlling data transmission comprising following steps of: obtaining transmission delays and time differences between a RNC and respective base stations by the RNC; configuring cells and a common channel for data transmitting by the RNC; controlling a start time of data transmission of each cells by the RNC; informing a UE of a frame offset and a chip offset of the common channel through an interface Uu by the RNC; and receiving configuration parameters of the common channel transmitted from the RNC by the UE. In the present invention, merging of signals transmitted from different cells via the common channel has been achieved so that the quality of signals received by the UE has been improved and the throughput of the system has been enlarged.

8 Claims, 13 Drawing Sheets

METHOD FOR CONTROLLING DATA TRANSMISSION

BACKGROUND OF THE INVENTION

1. Field of the Invention

This invention relates to $3^{rd}$ Generation (3G) mobile communication system, especially to a method for providing a Multimedia Broadcast/Multicast Service.

2. Description of the Related Art

Figure 1:
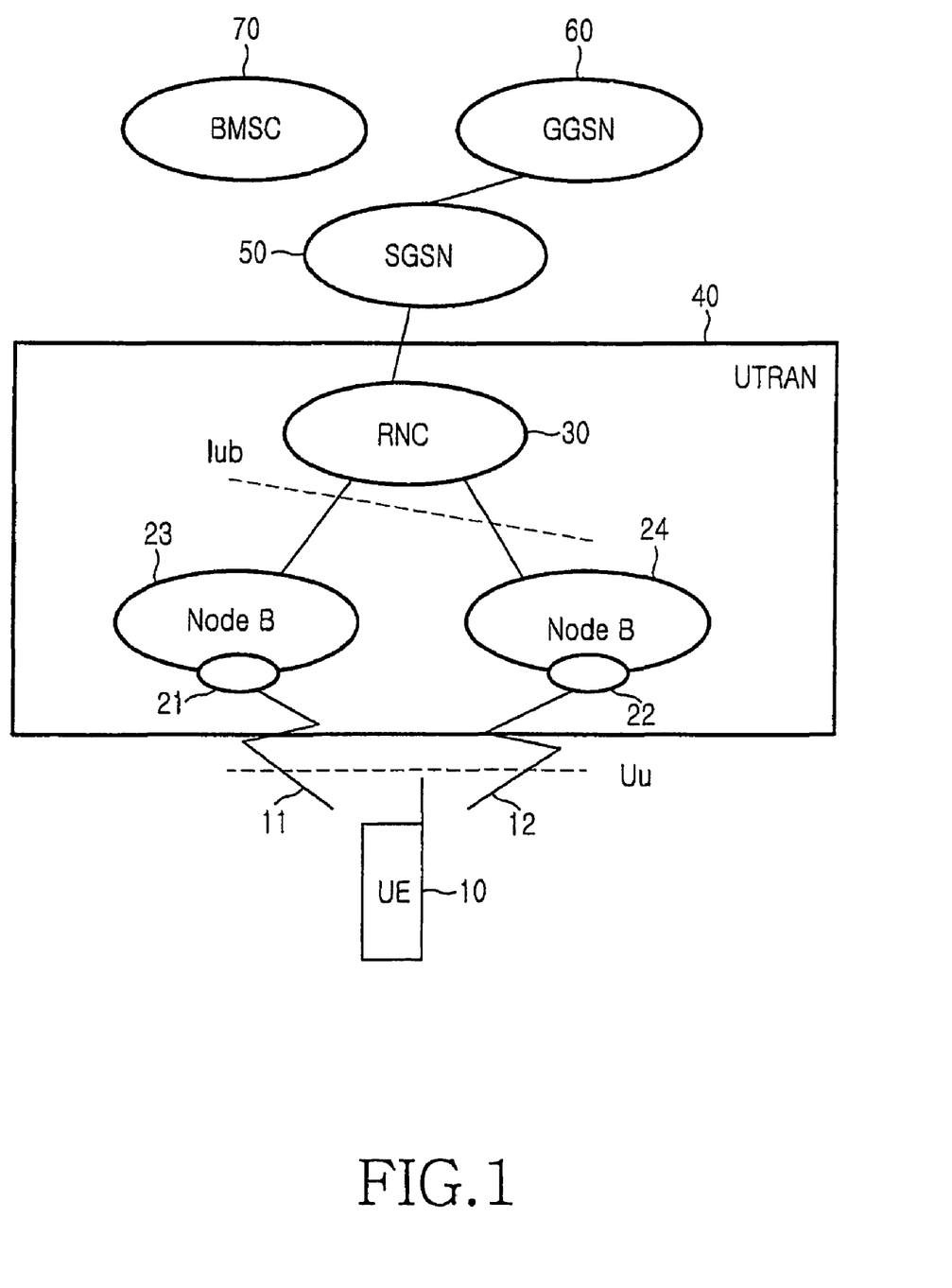
FIG. 1 shows a logic device diagram of MBMS.

The MBMS is a new service under standardization by $3^{rd}$ Generation Mobile Communication System Partnership Project. The MBMS service is a unidirectional point-to-multipoint (p-t-m) (i.e. multimedia data sent from a single data source are transferred to multiple users through network transmission) service. The most remarkable feature of the service is that it can make use of radio resources and network resources efficiently. MBMS service is mainly used in wireless communication network system, e.g. Wideband Code-Division Multiple Access system (WCDMA), Global System of Mobile Communication (GSM), etc. MBMS service data transfer basically includes following several steps, i.e. data source transmission, middle network transmission, destination cell on-the-air transmission and user receiving. FIG. 1 is a logical figure for network devices of a radio communication system that can provide the MBMS service, in which the MBMS actually makes use of General Packet Radio Data Service (hereinafter referred to as GPRS) as core transmission network. As shown in FIG. 1, a Broadcast and Multicast Service Center 70 (hereinafter referred to as BM-SC) is a data source for MBMS data transmission. A Gateway GPRS Supporting Node 60 (hereinafter referred to as GGSN) is used to connect the GRPS network with an external network, such as INTERNET. In the MBMS service, the Gateway GPRS Supporting Node, connects to the BM-SC and sends the MBMS data to a specific Service GPRS Supporting Node 50 (hereinafter referred to as SGSN). The SGSN is used to perform access control on UE as well as mobility management, and sends the MBMS data from the GGSN to a specific Radio Network Controller 30 (hereinafter referred to as RNC) at the same time. The RNC is used to control a group of base stations like station 23 and 24 and sends multimedia data to specific base stations like station 23 and 24. The base station 23 establishes an air common channel 11 for the MBMS service of cell 21 under the control of the RNC. The base station 24 establishes an air common channel 12 for the MBMS service of cell 22 under the control of the RNC and a terminal User Equipment 10 (hereinafter referred to as UE) is a terminal equipment for MBMS data reception.

When implementing a point-to-point communication between the UE and the network, a dedicated channel will be established by the network for the UE and the radio resource occupied by this channel can not be shared by any other UE but exclusively possessed by the UE in the communication process. In order to make use of the radio resource and the network resource effectively when the MBMS service is provided via the network, a common channel is adopted in the air interface for communicating between several UEs simultaneously. After the UE obtains the resource configuration of the common channel, it receives radio signals via the network so as to gain the MBMS service. However, an obvious feature different from the dedicated channel is that no common channel supports soft handover. Soft handover means that the user can simultaneously receive signals from several cells and then merge them to obtain better quality of signal and lower loss rate of data. For the UE 10 in FIG. 1, if the transmission channels are established for it in the cell 21 and cell 22 by the network, it can simultaneously receive signals from the cell 21 and cell 22 on the premise that the cell 21 is adjacent to cell 22.

Figure 2:
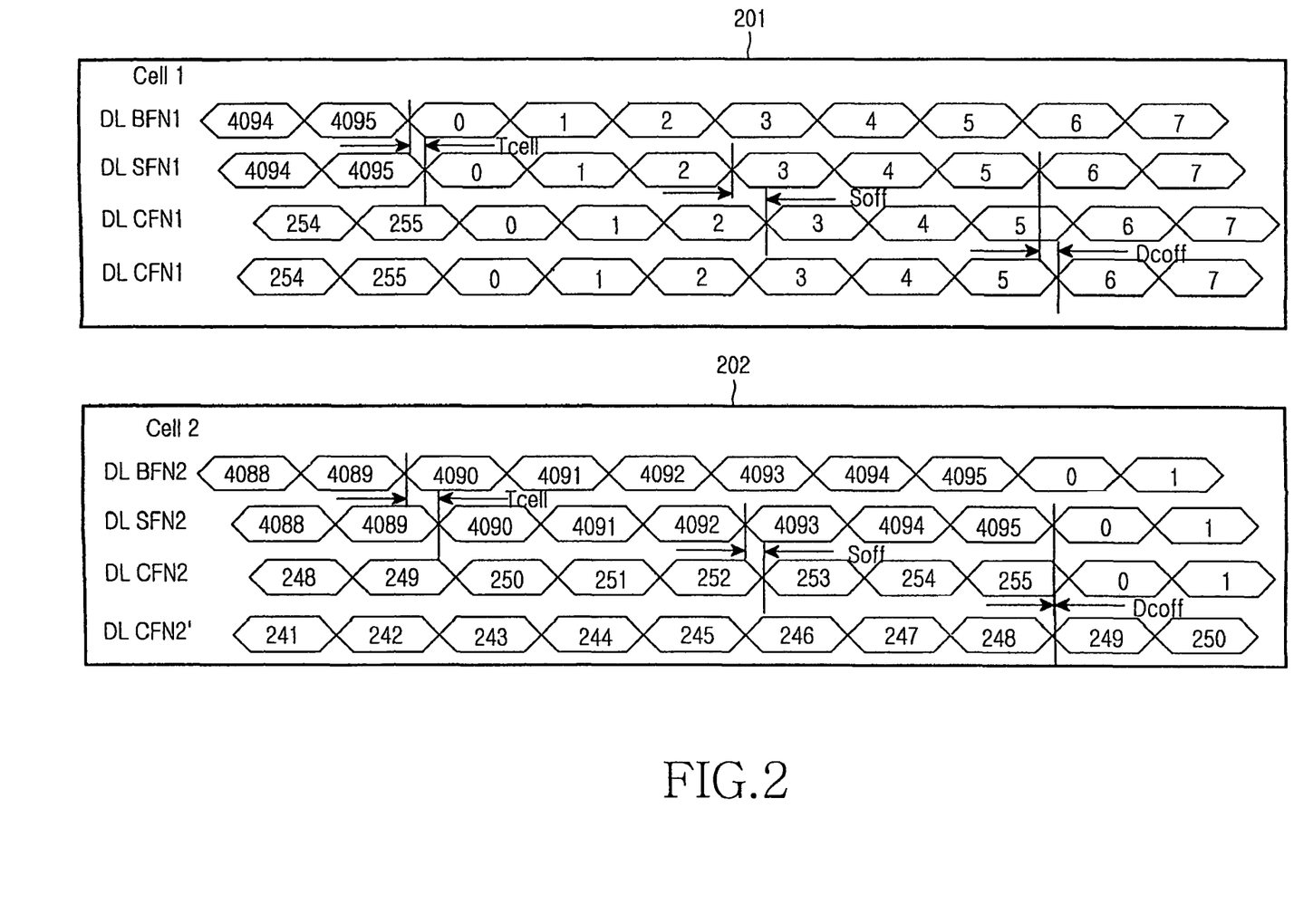
FIG. 2 shows a timing sequence diagram of a clock.

To support soft handover, a certain time delay must be satisfied to the signals received by a physical layer of the UE. For instance, in current WCDMA system, the time delay is required to be controlled within ±148 chip, i.e., 0.03854 milliseconds. Whether this requirement is met or not is controlled by the service RNC of the UE as shown in FIG. 2. Reference numeral 21 denotes cell 1, and 22 denotes cell 2 in FIG. 1. 201 shows a timing relationship corresponding to the cell 21, and 202 shows a timing relationship corresponding to the cell 22. In the following, definitions of respective clock in the WCDMA system are described:

BFN: a frame number of the Node B, each frame is 10 milliseconds long, and the frame number repeats from 0 to 4095.

SFN: a system frame number of the cell under the control of the Node B, each frame is 10 milliseconds long, and the frame number repeats from 0 to 4095. The time difference between the SFN and BFN is one Tcell, which values from 0 to 9 with the granularity of 256 chip (about $\frac{1}{15}$ milliseconds), i.e., the Tcell values 0, $\frac{2}{15}$, $\frac{3}{15}$, $\frac{4}{15}$, $\frac{5}{15}$, $\frac{6}{15}$, $\frac{7}{15}$, $\frac{8}{15}$, $\frac{9}{15}$ milliseconds.

CFN: CEN involves a type of channel through which the UE receives signals, if the channel is a common one, it equals SFN modulo 256, and if the channel is a dedicated one, it equals SFN subtracted by a frame offset modulo 256. A CFN1 and CFN2 in FIG. 2 are corresponding to the common channel, while a CFN1' and CFN2' are corresponding to the dedicated channel. The only difference consists in that the frame offset of the dedicated channel in 201 is zero while the frame offset of dedicated channel in 202 is 6. In an actual system, whether the dedicated channel or the common channel is in service, a chip-level time difference within 0~149 256-chips may exist between a start point of the channel's frame and that of the SFN's frames. To be simplified, as shown in FIG. 2, it is assumed that Dcoff is the chip offset of two cells 21 and 22 corresponding to the dedicated channel, and Soff is the chip offset of the two cells 21 and 22 corresponding to the common channel.

Figure 3:
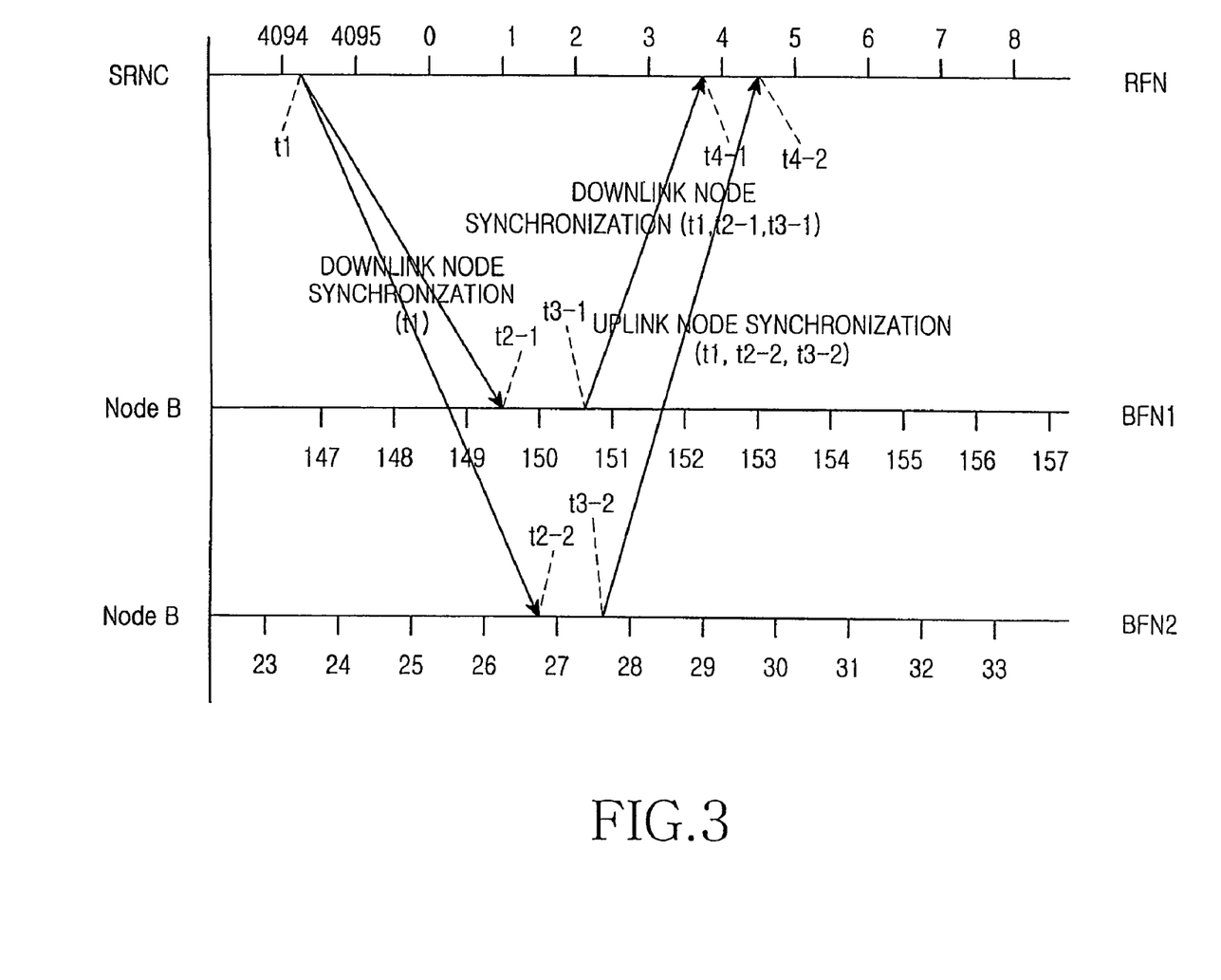
FIG. 3 shows a timing sequence of synchronization between the RNC and the Node B.

Since there is no device such as a GPS is applied in the WCDMA system for all network elements in clock adjusting, it is possible that the clock of every network element be different. Moreover, a deviation may happen to every clock's frequency. The RNC has its own clock for time control, and the Node B also has its own clock for time control. However, since all resource configurations of the Node B are under the control of the RNC, and the time for data sending is also managed by the RNC, it is necessary to make the RNC have some knowledge to the clock's characteristics of the Node B. FIG. 3 illustrates a method of node synchronization between the RNC and the Node B. The clock of the RNC is denoted by RFN, which is the frame number of the RNC side, each frame is 10 milliseconds long and the frame number repeats from 0 to 4095. The time within a cycle can be denoted as from 0 to 40959.875 with the granularity of 0.125 milliseconds, which equals to the length of 480 chip. The RNC sends a downlink node synchronization message to the Node B, which contains time t1 when the message is sent. After the Node B receives that message, it records time t2 when the message is received, then sends an uplink node synchronization message to the RNC, which contains the time t1, t2 and t3. Here, t3 is time when the Node B sends the uplink node synchronization message. After the RNC receives the message, it records time t4 when the message is received. Till now, the node synchronization process between the RNC and the Node B completes.

According to the four parameters t1, t2, t3 and t4, a data transmission delay between the RNC and the Node B can be calculated by the RNC, and a time corresponding relationship between the RNC and the Node B can also be set forth. It is assumed that a RTD denotes the time delay between the RNC and the Node B, RTD=(t4−t1−t3+t2)/2. The time corresponding relationship between the RNC and the Node B is that: time of Node B=time of RNC+t2−t1−RTD. However, in the actual transmission process, the RTD and variation of the RTD should be considered, for the transmission delay in an interface Iub may not involve the actual situation of the transmission network.

With the equations above, if it is supposed that the transmission delay between the RNC and the Node B is almost invariable, the RNC can know the time of the Node B clearly with the granularity of the time be 0.125 milliseconds, i.e., 480 chip.

It is not enough to know the time of Node B for the RNC, it also clearly controls the transmission time of the common channel. As shown in FIG. 2, the transmission time of the common channel should be: BFN+Tcell+Soff. The following requirement should be satisfied to keep the time delays of different cells in transmitting data less than the required: an absolute value of ((BFN1+Tcell1−Soff1)−(BFN2+Tcell2+Soff2))<the required time delay.

In the WCDMA system, the transmission of a new copy of data can not be started from any of the frames and a transmission time interval TTI is defined for each transmission channel. The value of the TTI is integral multiple to the frame length, such as 10 milliseconds, 20 milliseconds, 40 milliseconds or 80 milliseconds and the corresponding number of frames occupied by each TTI is 1, 2, 4 and 8 respectively. The start point of these TTIs can only be the time when the CFN modulo Fn equals 0, where the Fn is the number of the frames corresponding to the TTIs. In addition, the RNC also controls the cells' or the common channel's configuration parameters so as to make the start point of the data received by the UE be the same within a TTI. Therefore the formula should be modified as: an absolute value of (((BFN1+Tcell1+Soff1)−(BFN2+Tcell2+Soff2)) mod Fn)<the required time delay.

Since the maximum lengths of Tcell and Soff are 9/15 milliseconds and 10 milliseconds respectively, it is impossible to make the time delay difference of data received from the two cells by the UE be less than 10 milliseconds in the case that the BFNs of the two cells are absolutely different, no matter how to regulate Tcell or Scoff. In general, the time of 10 milliseconds is greater than the time delay requirement for the UE in the signal merging. In the MBMS, the user data is transmitted through the common channel. To make all users receive the signal at any location of the cell, the required transmitting power of the common channel is higher. Therefore interference is generally caused to the adjacent cells so that the system capacity is reduced. Thus a method for merging the signals via the common channel of different cells has been proposed, which requires that the time delay of the signals transmitted from adjacent cells via the same common channel should not be over a certain value, otherwise, the object of signal merging and reception quality optimizing can not be reached. However, the time delay of the signals transmitted from adjacent cells via the same common channel can not be guaranteed within a relative small range in the current system at all.

SUMMARY OF THE INVENTION

The object of this invention is to provide a method for controlling data transmission, which guarantees that a time delay of signals transmitted from adjacent cells via the same common channel be controlled within a relative small range so that it is possible for a UE to merge signals received from several cells.

To achieve the object mentioned above, a method for controlling data transmission comprising following steps of:

obtaining transmission delays and time differences between a RNC and respective base stations by the RNC;

configuring cells and a common channel for data transmitting by the RNC;

controlling a start time of data transmission of each cells by the RNC;

informing a UE of a frame offset and a chip offset of the common channel through an interface Uu by the RNC; and receiving configuration parameters of the common channel transmitted from the RNC by the UE.

In the present invention, merging of signals transmitted from different cells via the common channel has been achieved so that the quality of signals received by the UE has been improved and the throughput of the system has been enlarged.

DETAILED DESCRIPTION OF THE PREFERRED EMBODIMENTS

Figure 4:
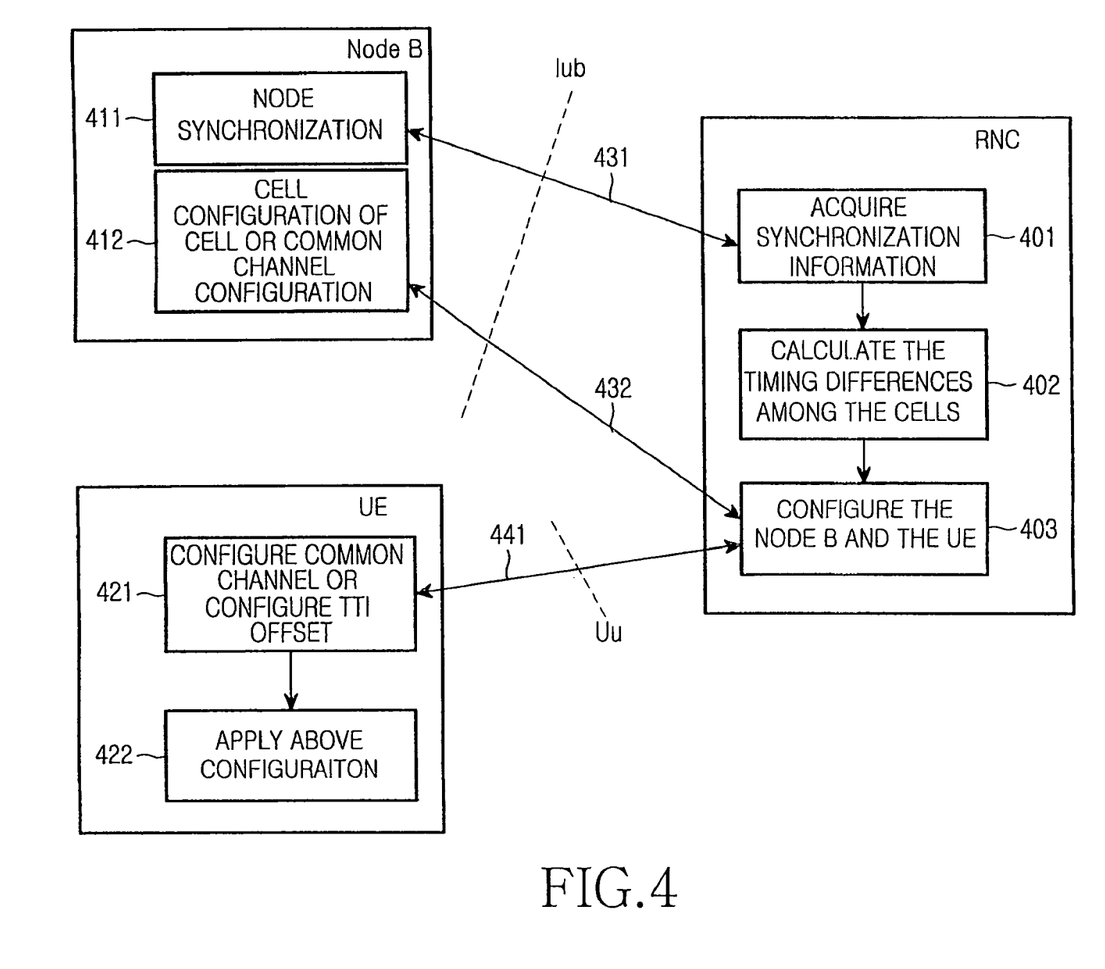
FIG. 4 illustrates a block diagram of a structure according to the present invention.

To make the time differences that the same copy of data is transmitted from different cells be relative small, such as 5 milliseconds, the RNC must know the time differences between each of the Node Bs at first (401). This function can be realized with reference to the flow chart illustrated in FIG. 3, which is applied in FIG. 4 to obtain step 431. After the process of node synchronization between the RNC and the Node B 23 and 24 completes respectively, i.e., the signaling interaction between 411 and 412 according to the flow illustrated in FIG. 3 completes, the RNC will know the difference of BFNs between its controlled Node B 23 and 24: BFN1−BFN2=(t2−1−t1−1−RTD1)−(t2−2−t1−2−RTD2). In an existing system, the granularity of the time difference is 0.125 milliseconds and the algorithms differ from one another for the concrete realization approaches.

Figure 5:
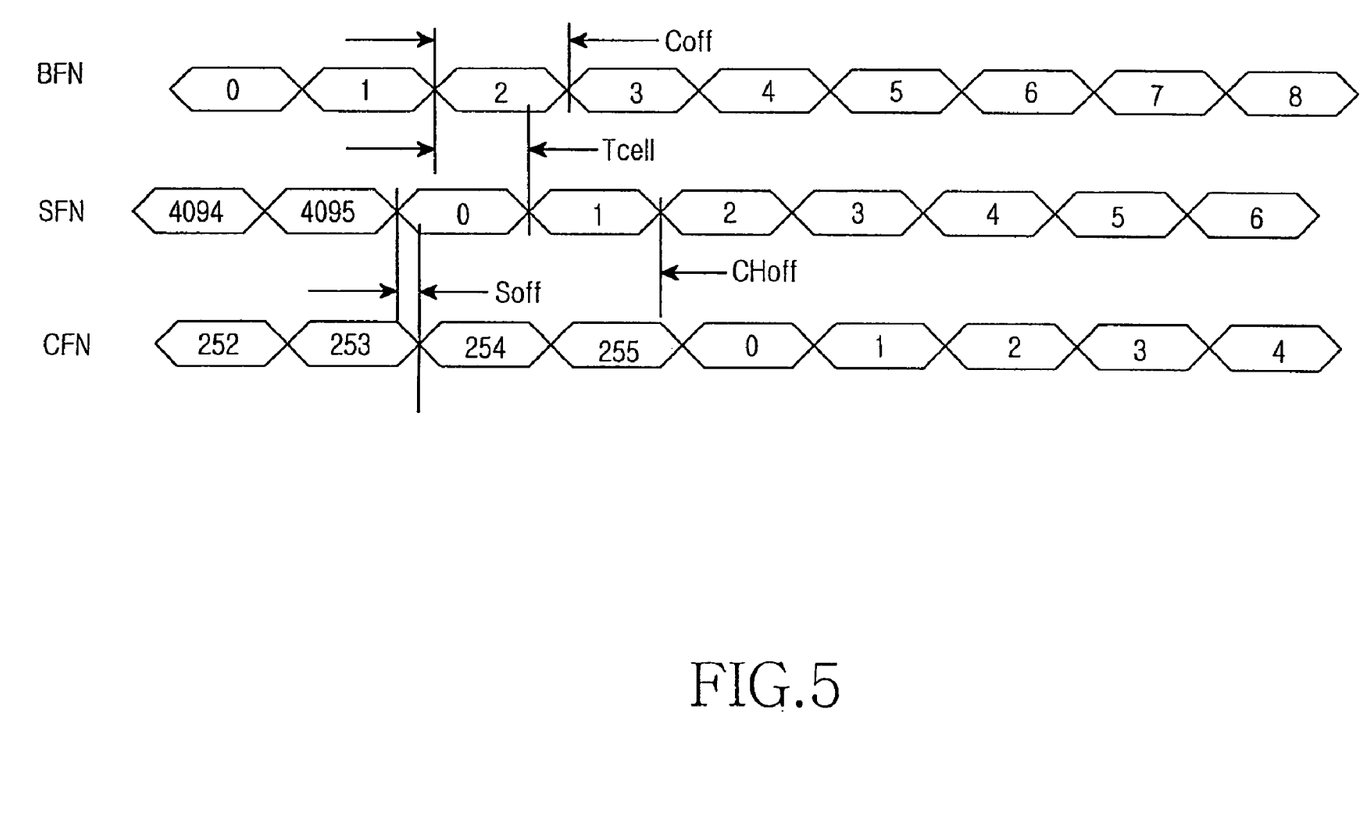
FIG. 5 illustrates a definition of clocks in the present invention.

After 401 completes, it is necessary for the RNC to determine the particular time 402 for every cell so as to transmit data. In different embodiments, the RNC configures either parameter Tcell or Soff of the cell or both of Tcell and Soff. The ranges of the two parameters must be expanded over their originals. For the convenience of understanding, the expanded Tcell is split into two parameters, one is Tcell which has the same function and range as that defined in the existing system, other is Coff which indicates the difference between the BFN and SFN of every cell of different Node Bs. The expanded Soff indicates a time offset of the common channel with respect to the SFN within one frame. For the convenience of understanding, the expanded Soff is split into two parameters, one is Soff which has the same function and range as that defined in existing system, other is CHoff which indicates a frame offset of CFNs in different MBMS transmission channels with respect to the SFN of the cell. The definitions of the four parameters are shown in FIG. 5. As seen from FIG. 5, a start time of SFN=a time indicated by BFN−the time indicated by Coff−a time indicated by Tcell and a start time of the common channel CFN=a time indicated by SFN−a time indicated by CHoff−a time indicated by Soff. With such calculation formula, when the Node B is informed of the four parameters through the Iub signaling (432), it can calculate the corresponding start time for data transmitting.

The RNC informs the UE of the frame offset and chip offset of the common transmission channel through the signaling of interface Uu 441. By reading system information of the cell, the UE obtains the SFN, and the UE can learn about from which frame and chip the data within a TTI starts by following calculation formula of the CFN: CFN=(SFN−Choff) mod 256. The start frame of TTI is the one satisfying that the CFN modulo Fn equals 0, where Fn indicates how many frames the TTI has.

Figure 6:
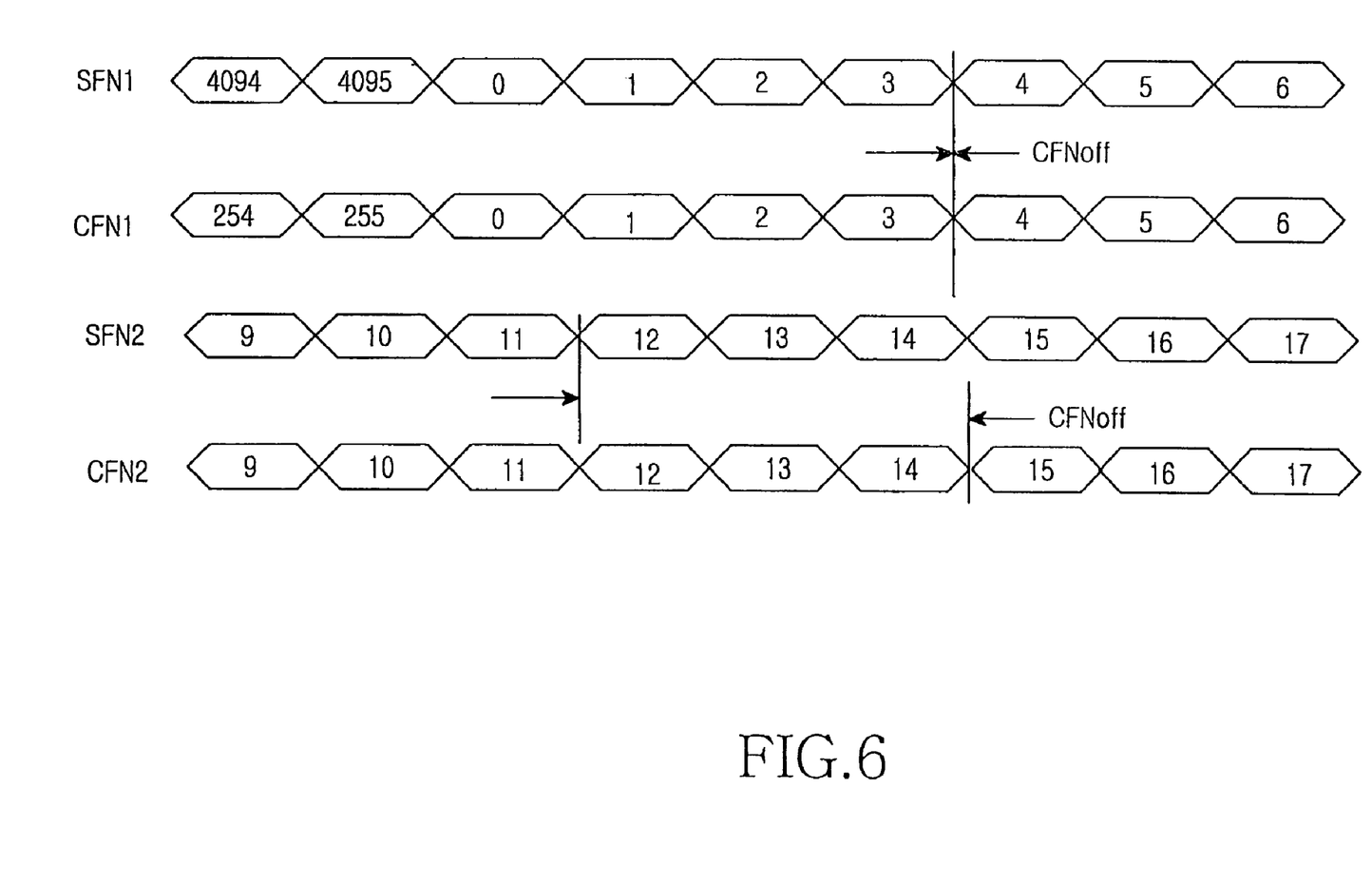
FIG. 6 illustrates a clock relationship in the side of the UE of the present invention.

Another method proposed is to only regulate the UE in calculating the start frame of the TTI to meet the requirement of time delay. From the previous description, it will be seen that the start frame of the TTI is the one satisfying that CFN modulo Fn equals 0, where Fn indicates how many frames the TTI has. Since the CFNs of the common channel transmitted from different cells are different, in order to make the UE know the start time of the TTI, a CFNoff value should be transmitted, for each common channel that transmits the MBMS data. With this value, the UE can regulate the start time of the TTI correspondingly, as shown in FIG. 6. In the cell 22, as shown in FIG. 6, the start time of TTI of the data received by the UE does not satisfy the formula above, one offset should be considered in this case. In this example, the TTI is 40 milliseconds long, i.e., the TTI should start at the frame satisfying that CFN modulo 4 equals 0. In cell 21, the offset of the CFN is 0, and in cell 22, the offset of the CFN is 3.

Figure 7:
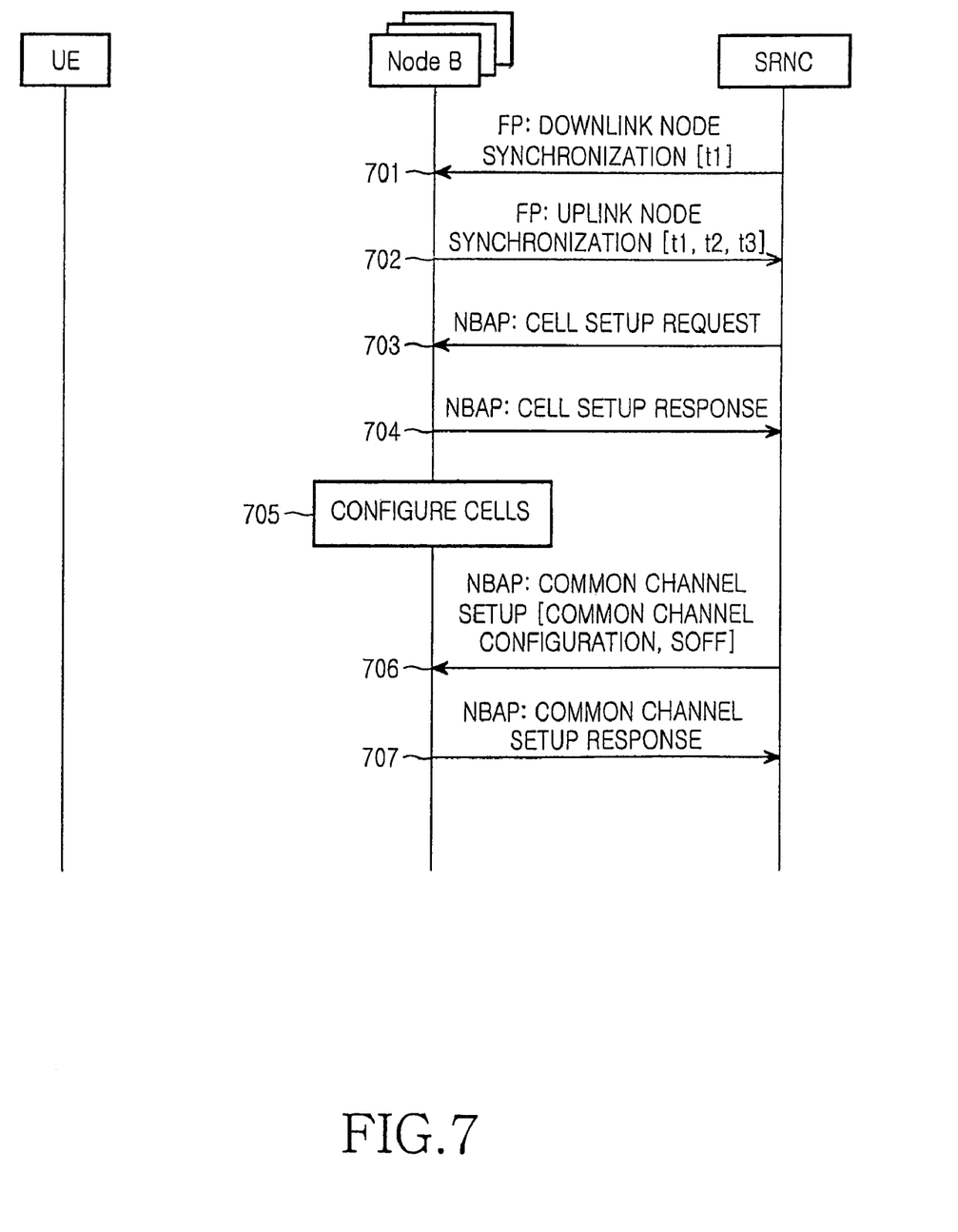
FIG. 7 illustrates the first embodiment of the present invention.

FIG. 7 shows the first embodiment of the present invention.

Figure 10:
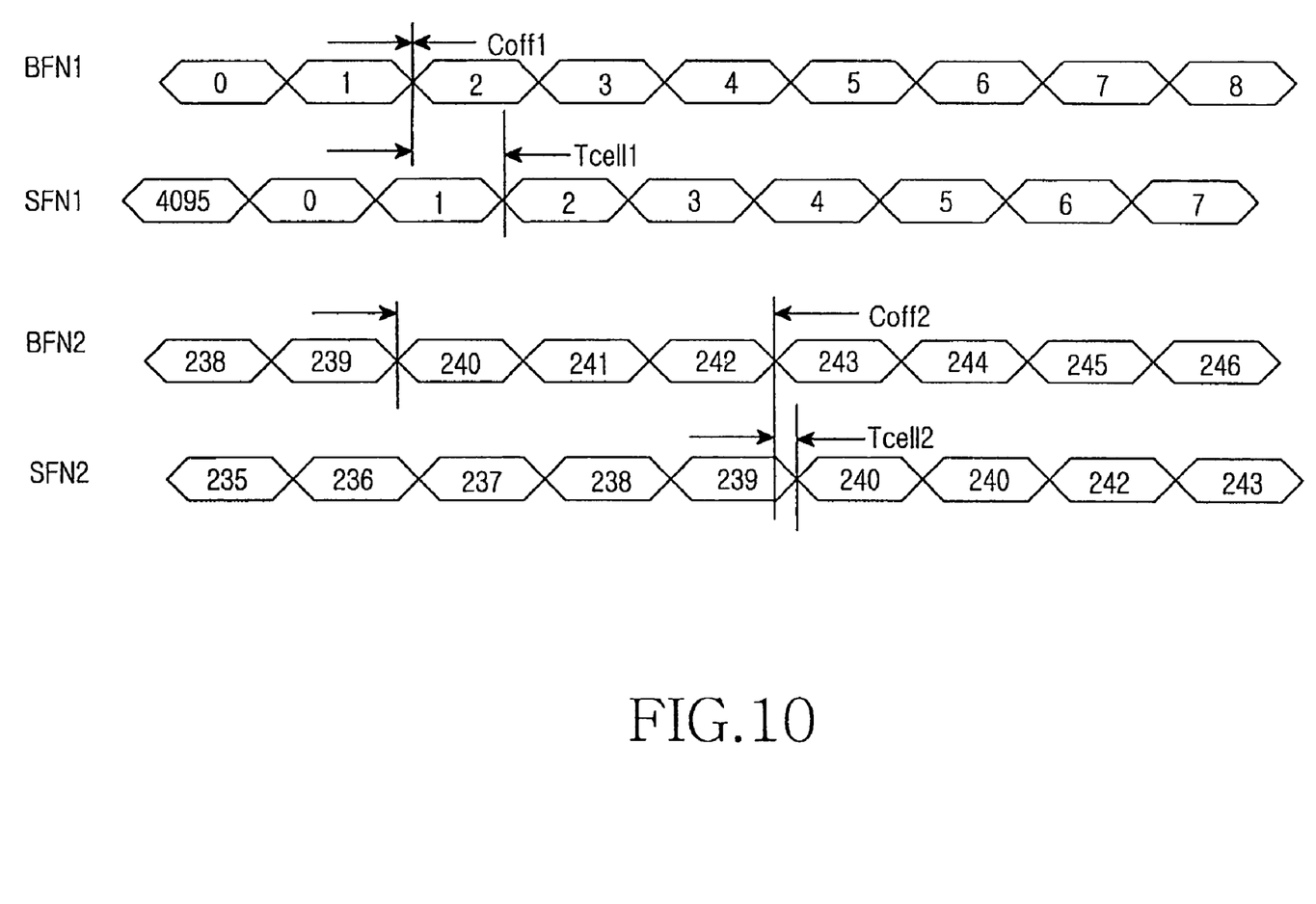
FIG. 10 illustrates a timing sequence of the first embodiment of the present invention.

The embodiment is implemented through modifying frame offsets of different cell. In 701 and 702, the transmission delay and the time difference of interface Iub between the RNC and the Node B are obtained through the process of synchronization between the RNC and the Node B illustrated in FIG. 3. After the RNC collects the transmission delays and time differences between itself and the other Node Bs, it begins to calculate the offset values of the cells under the configuration of different Node Bs so as to make all cells' time differences of the frames satisfying that SFN modulo Fn equals 0 within the required time delay range. One method for calculating the time difference is to take one Node B as the reference, and make the other Node Bs relate to it, as shown in FIG. 10. The time relationship between the SFN and BFN in FIG. 10 is that: a time indicated by SFN1=a time indicated by BFN1−a time indicated by Coff−a time indicated by Tcell, where the time indicated by Coff is 0. A time indicated by SFN2=a time indicated by BFN2−a time indicated by Coff2−a time indicated by Tcell2, where Coff2 is three frames long. From FIG. 10, it is seen that the difference of SFNs of the two cells is not greater than one frame in case that Fn equals 4.

After the RNC configures Coff and Tcell for each cell according to algorithm above, it transfers these parameters to the Node B in 703 and 704. The Node B configures the transmitting time for cell 705 according to the two parameters and broadcasts SFN of the cell via the broadcast channel. In 706 and 707, the method for establishing the common channel is just the same as that of the existing technique. The RNC sends the configurations related to the common channel to the Node B and establishes the common channel, whose offset of the transmitting time is Soff. This Soff has the same reference value as that of the existing technique.

Figure 8:
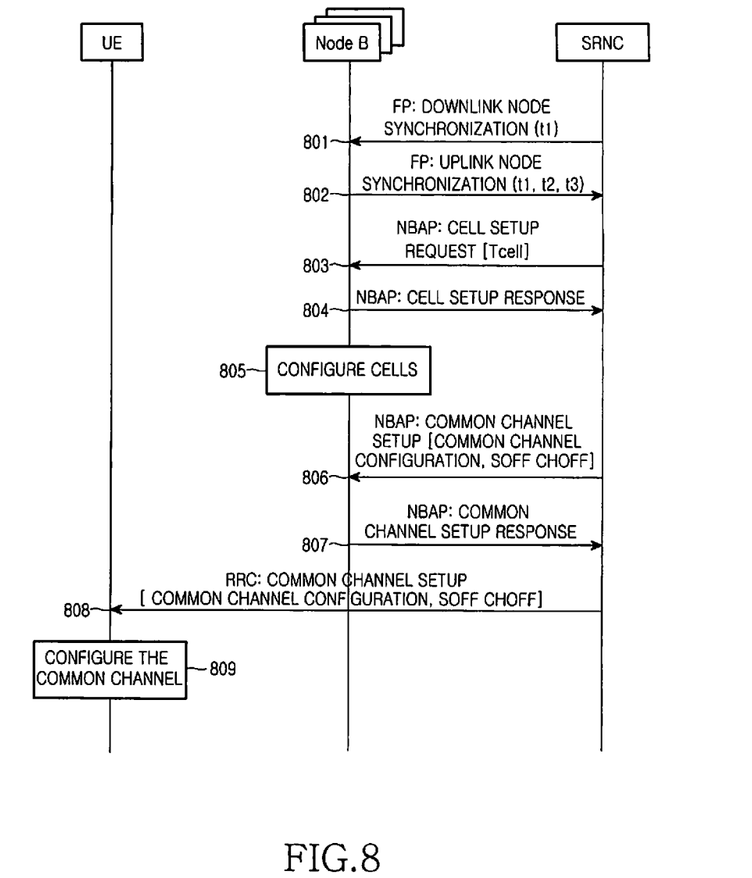
FIG. 8 illustrates the second embodiment of the present invention.

FIG. 8 shows the second embodiment of the present invention. The embodiment is implemented by modifying the frame offsets of different cells in the common channel. In 801 and 802, transmission delay and the time difference of interface Iub between the RNC and the Node B are obtained through the process of synchronization between the RNC and the Node B illustrated in FIG. 3. In 803 and 804, the RNC configures the transmission offset Tcell for the cells of every Node B according to available solution. In 805, the Node B configures the transmission offset for the cells according to the configuration parameters transmitted from the RNC. To establish the common channel for data transmitting, the RNC send 806 to the Node B, where the frame offset and chip offset of the common channel are determined by CHoff and Soff, and the Node B configures the transmitting time of the common channel according to the two parameters. After the RNC succeeds in establishing the common channel in the side of the network, it sends the common channel's parameters to UE through the signaling RRC. After the UE obtain the common channel's configuration parameters, the frame offset and chip offset through 808, it calculates the start time for data receiving. The common channel's CFN is calculated with the formula: CFN=(SFN−CHoff) mod 256. TTI's start point is the frame number satisfy that CFN mod Fn=0. The UE can obtain not only the configurations of the current cell's common channel, but also the configurations of the adjacent cell's common channel used to provide MBMS service, especially the common channel's parameter Choff. When the UE simultaneously receives signals from several cells at the edge of a cell, it receives signals via the common channel of the several cells and merges them according to the configurations of the common channel of the several cells.

Figure 9:
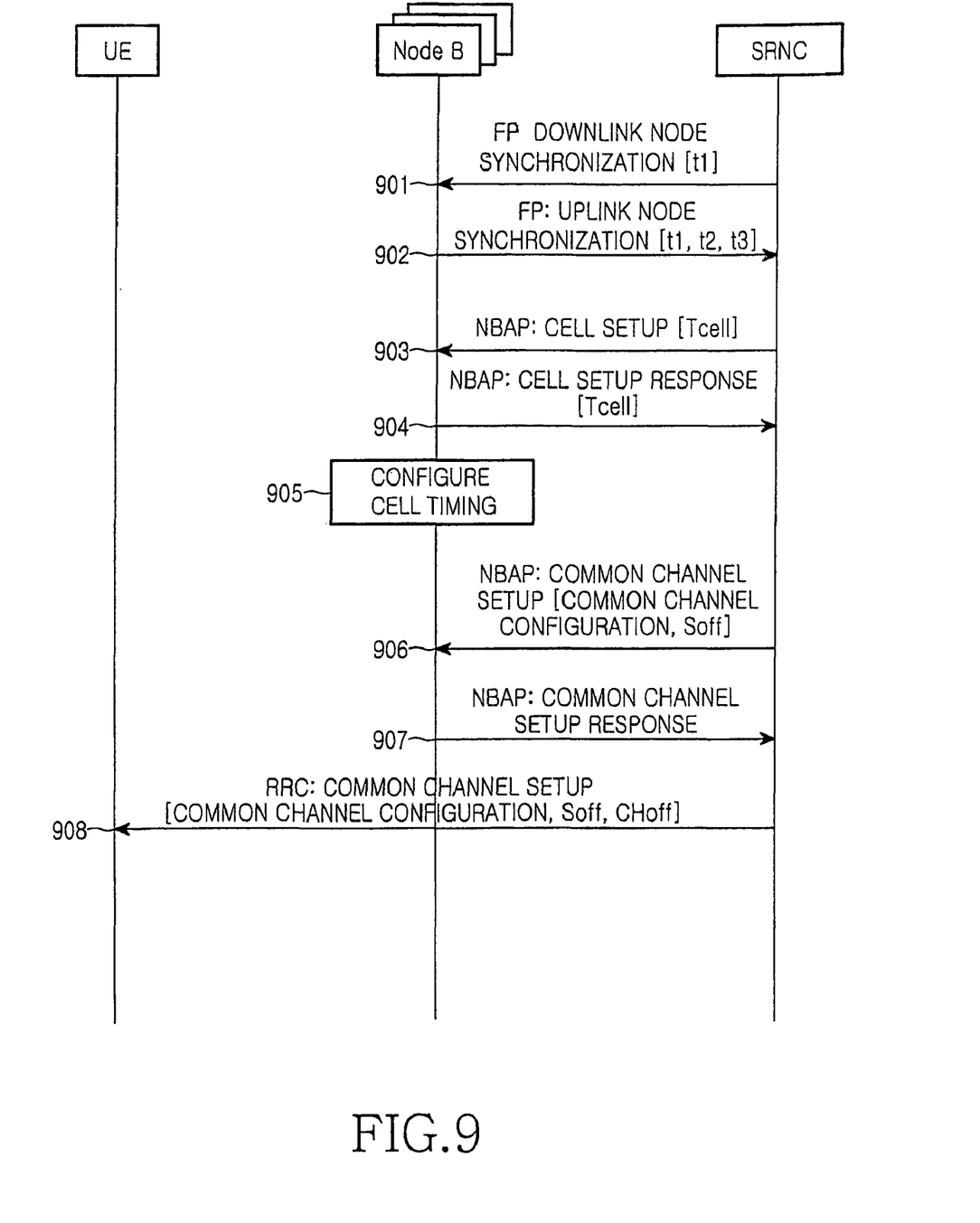
FIG. 9 illustrates the third embodiment of the present invention.

FIG. 9 shows the third embodiment of the present invention.

The embodiment is implemented by configuring the offset of the TTI's start frame in the side of the UE. From 901 to 907, the embodiment is the same as that of the existing technique. They also can be realized according to the relevant signaling flow in FIG. 7. In 908, after the RNC succeeds in configuring the cells and the common channel in the side of the network, it informs the UE of the offset of the TTI's start frame. The UE determines the start time of TTI in the common channel according to this offset. The determination method is that: the frame satisfying that (CFN−CFNoff) mod Fn=0. The UE can obtain not only the configurations of the current cell's common channel, but also the configurations of the adjacent cell's common channel used to provide MBMS service, especially the offset of the TTI's start frame of the common channel. When the UE simultaneously receives signals from several cells at the edge of a cell, it regulates the offset of the TTI's start frame of common channel for different cells according to the configurations of the common channel of the several cells and receives signals via the common channel of the several cells and merges them.

Figure 11:
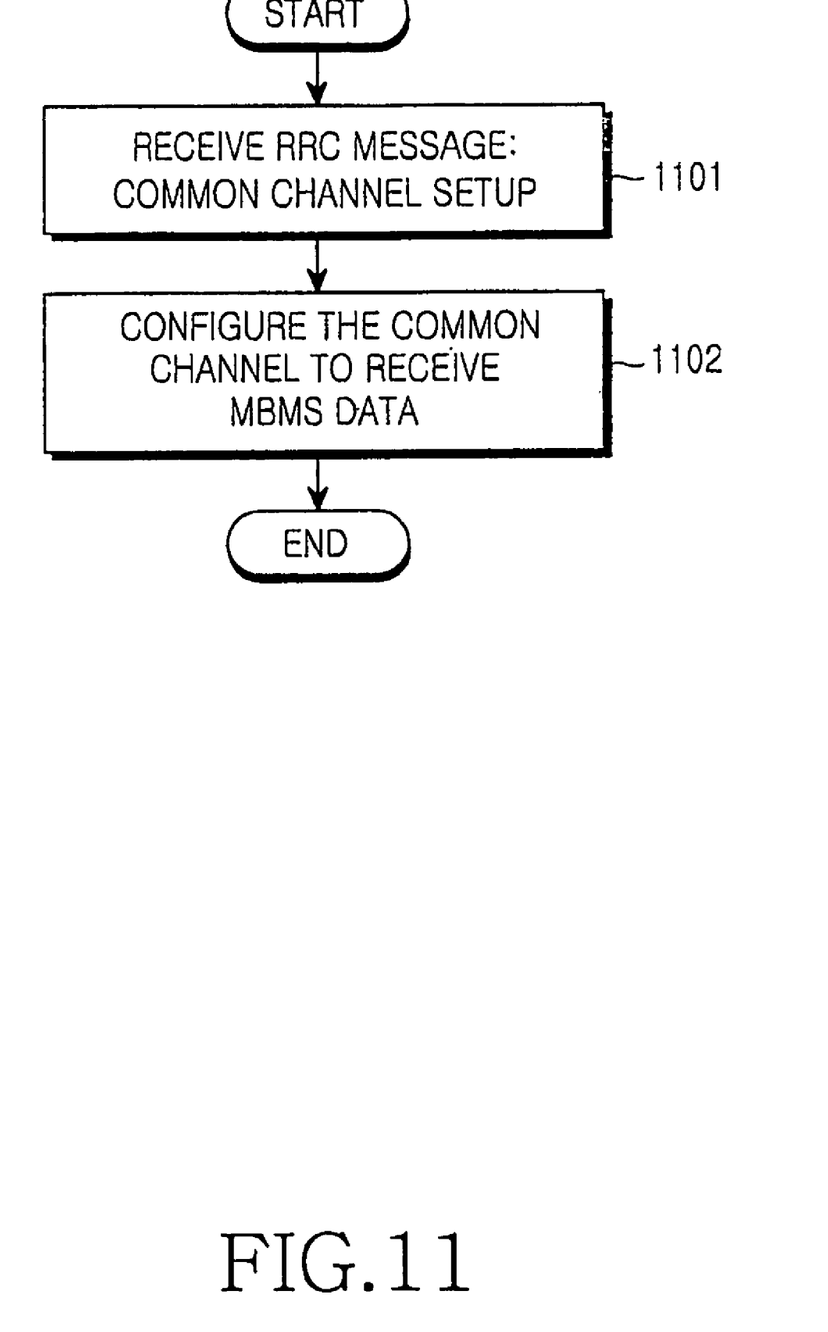
FIG. 11 illustrates the behavior of the UE of the present invention.

FIG. 11 shows the behavior of the UE of the present invention.

Before the reception of MBMS data, the UE monitors the COMMON CHANNEL SETUP message via MCCH 1101 (the RRC message name can be different). This message includes the physical layer and MAC layer configuration parameters and common channel frame offset Choff described in FIG. 8 or the TTI offset described in FIG. 9. 1102 the UE calculates the starting time of TTI based on these two parameters. If the parameter is Choff, then CFN equals to (SFN−Choff) mod 256. The starting frame of TTI fulfills the equation CFN mod Fn=0. If the parameter is CFNoff, then the starting frame of TTI fulfills the equation (CFN−CFNoff) mod Fn=0.

Figure 12:
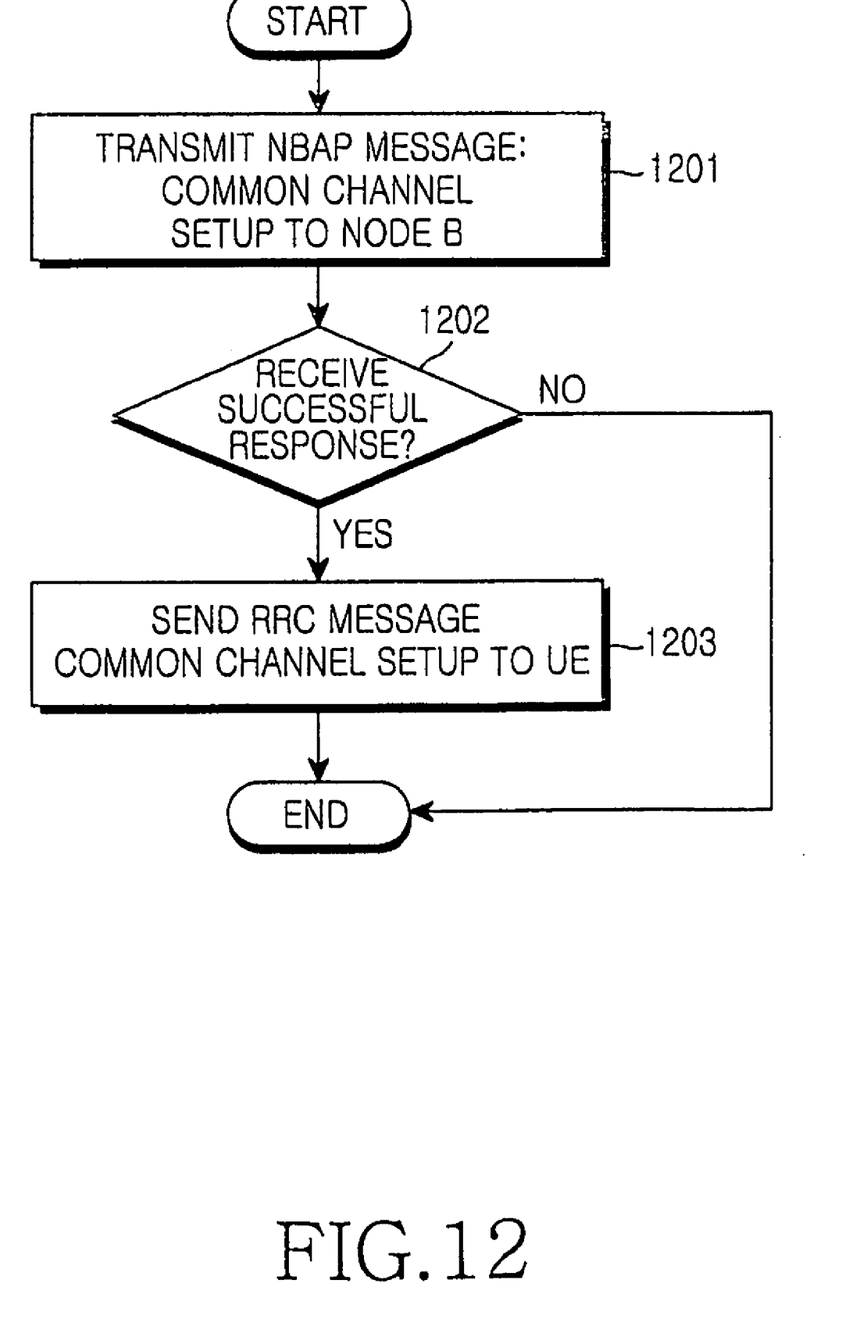
FIG. 12 illustrates the behavior of the RNC of the present invention.

FIG. 12 shows the behavior of the RNC of the present invention.

When the RNC decides to provide MBMS on common channels, it calculates the Choff for the common channels of each cell. RNC sends to the Node B COMMON CHANNEL SETUP REQUEST message (the message name can be different) 1201. This message 806 includes the physical layer and MAC layer configuration of the common channel and Choff described in FIG. 8. When the RNC receives the response from the Node B 1202, it will check whether the response is successful. If yes, the RNC sends COMMON CHANNEL SETUP 1203 to the UE, which includes the physical layer and MAC layer configuration parameters and Choff described in FIG. 8 or TTI offset described in FIG. 9. Otherwise, the MBMS service cannot be transmitted over common channel.

Figure 13:
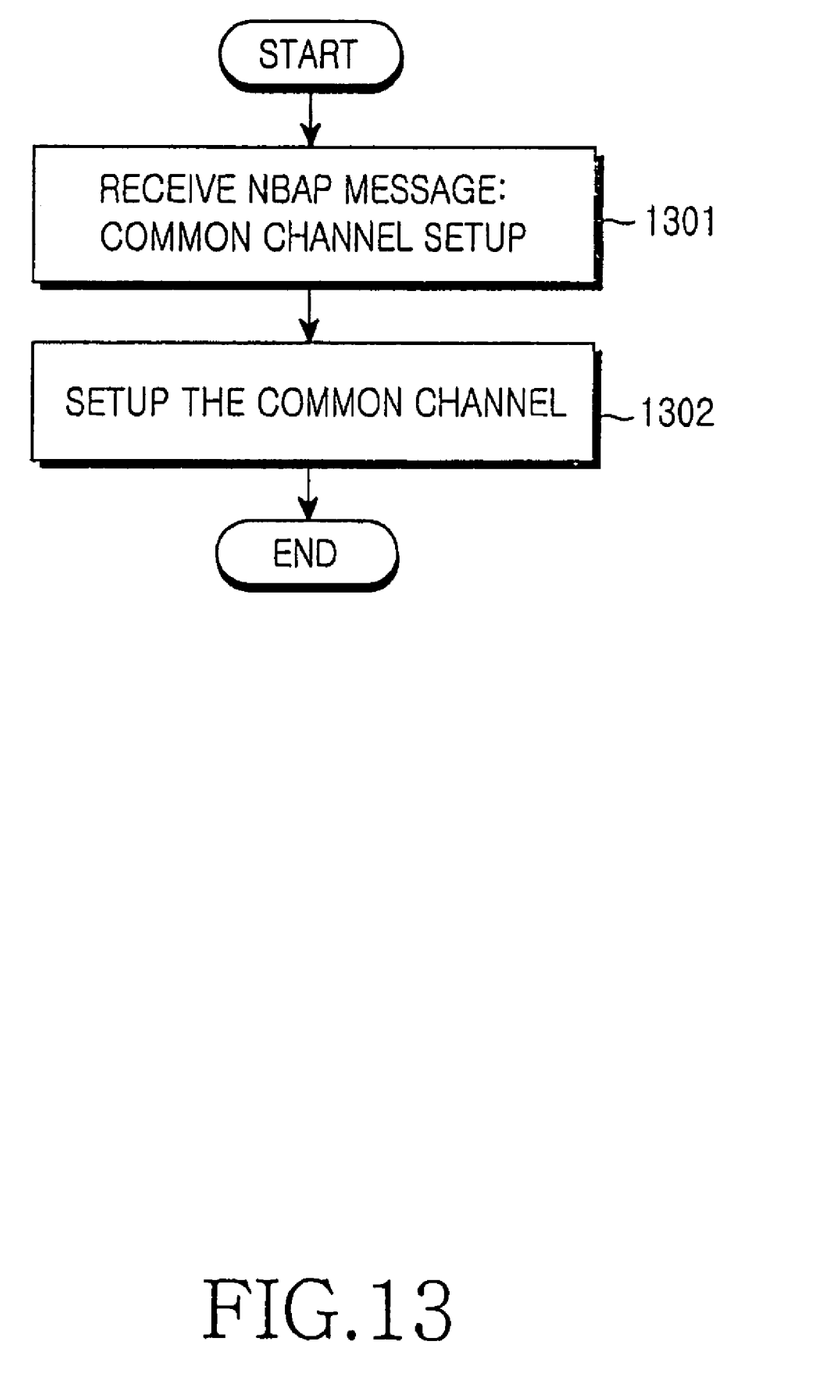
FIG. 13 illustrates the behavior of the Node B of the present invention.

FIG. 13 shows the behavior of the Node B of the present invention.

When the Node B receives the COMMON CHANNEL SETUP REQUEST (message name could be different) message 1301, which includes the physical layer and MAC layer configuration parameters and Choff described in FIG. 8 or TTI offset described in FIG. 9. 1302 the Node B calculates the TTI starting time for the common channel and send MBMS notification accordingly. CFN fulfills the following equation (SFN−Choff) mod 256. The starting time of TTI fulfills that CFN mod Fn equals to zero.

What is claimed is:

1. A method for controlling data transmission by a Radio Network Controller (RNC) in a communication system, comprising steps of:
  obtaining transmission delays and time differences between the RNC and each of a plurality of Node Bs managed by the RNC;
  configuring an offset of a System Frame Number (SFN) for each cell in which each of the plurality of Node Bs is located relative to a Node B Frame Number (BFN) of each of the plurality of Node Bs using one of the plurality of Node Bs as a reference Node B;
  configuring a common channel for data transmission;
  transmitting configuration parameters for each cell and configuration parameters of the common channel to a first Node B which is one of the plurality of Node Bs; and
  informing a User Equipment (UE) of the configuration parameters of the common channel, wherein the configuration parameters for the each cell include the offset for the each cell and a start time indicated by a reference frame,
  wherein the configuration parameters of the common channel include a frame offset and chip offset which are determined by a CHoff which indicates a frame offset of Channel Frame Number (CFN) in different Multicast Broadcast and Multicast Service (MBMS) transmission channels with respect to the SFN for the each cell, and a Soff which indicates a time offset of the common channel with respect to the SFN for the each cell within one frame.

2. The method of claim 1, wherein configuring the offset comprises:
  determining one of frames of the reference Node B as the reference frame; and
  calculating a time difference between the start time and a time indicated by the SFN for each cell.

3. The method of claim 1, wherein the configuration parameters of the common channel include a chip offset.

4. The method of claim 1, further comprising:
  informing the UE of a frame offset of the common channel of adjacent cells or a start time of a Transmission Time Interval (TTI) through a channel of a current cell in which the UE is located.

5. A Radio Network Controller (RNC) for controlling data transmission in a communication system, comprising:
  a processor for obtaining transmission delays and time differences by the RNC, between the RNC and each of a plurality of Node Bs managed by the RNC, configuring an offset of a System Frame Number (SFN) for each cell in which each of the plurality of Node Bs is located relative to a Node B Frame Number (BFN) of each of the plurality of Node Bs using one of the plurality of Node Bs as a reference Node B, and configuring a common channel for data transmission; and
  a transmitter for transmitting configuration parameters for each cell and configuration parameters of the common channel to a first Node B, which is one of the plurality of Node Bs, and informing a User Equipment (UE) of the configuration parameters of the common channel, wherein the configuration parameters for each cell include the offset for each cell and a start time indicated by a reference frame,
  wherein the configuration parameters of the common channel include a frame offset and chip offset which are determined by a CHoff which indicates a frame offset of Channel Frame Number (CFN) in different Multicast Broadcast and Multicast Service (MBMS) transmission channels with respect to the SFN for the each cell, and a Soff which indicates a time offset of the common channel with respect to the SFN for the each cell within one frame.

6. The RNC of claim 5, wherein the RNC processor determines one of frames of the reference Node B as the reference frame, and calculates a time difference between the start time and a time indicated by SFN for the each cell, the offset for the each cell.

7. The RNC of claim 5, wherein the configuration parameters of the common channel include a chip offset.

8. The RNC of claim 5,
  The RNC informs the UE of a frame offset of the common channel of adjacent cells or a start time of a Transmission Time Interval (TTI) through a channel of a current cell in which the UE is located.

* * * * *